(12) United States Patent
Benjamin et al.

(10) Patent No.: US 8,070,951 B2
(45) Date of Patent: Dec. 6, 2011

(54) METHOD FOR REMOVING CONTAMINANTS FROM LIQUIDS USING MEMBRANE FILTRATION IN COMBINATION WITH PARTICLE ADSORPTION TO REDUCE FOULING

(75) Inventors: Mark M. Benjamin, Seattle, WA (US);
Yu-Jung Chang, Bellevue, WA (US);
Jaeshin Kim, Midland, MI (US);
Zhenxiao Cai, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 126 days.

(21) Appl. No.: 12/487,518

(22) Filed: Jun. 18, 2009

(65) Prior Publication Data
US 2009/0314714 A1    Dec. 24, 2009

Related U.S. Application Data

(60) Provisional application No. 61/074,068, filed on Jun. 19, 2008.

(51) Int. Cl.
*B03D 3/06*     (2006.01)
*B01D 39/00*    (2006.01)

(52) U.S. Cl. ........ 210/638; 210/636; 210/650; 210/663; 210/702; 210/774; 210/777; 210/504; 502/406

(58) Field of Classification Search .................. 210/636, 210/650, 663, 638, 696, 702, 777, 504; 502/406
See application file for complete search history.

(56) References Cited

U.S. PATENT DOCUMENTS

| | | | |
|---|---|---|---|
| 2,076,545 | A | 4/1937 | Caldwell |
| 2,163,525 | A | 6/1939 | Caldwell |
| 2,163,526 | A | 6/1939 | Caldwell |
| 2,163,527 | A | 6/1939 | Caldwell |
| 2,367,496 | A | 1/1945 | Greentree |
| 2,701,792 | A | 2/1955 | Owen |
| 3,222,277 | A | 12/1965 | Joyce |
| 3,470,104 | A | 9/1969 | Domas |
| 3,499,837 | A | 3/1970 | Jaunarajs |
| 3,876,451 | A | 4/1975 | Zall |
| 4,094,777 | A | 6/1978 | Sugier |
| 4,276,160 | A | 6/1981 | Donnert |
| 4,363,749 | A | 12/1982 | Weiss |
| 4,459,370 | A | 7/1984 | van der Wal |
| 4,475,397 | A | 10/1984 | Riley |
| 4,481,087 | A | 11/1984 | DiGiacomo |
| 4,565,633 | A | 1/1986 | Mayenkar |
| 5,051,189 | A | 9/1991 | Farrah |
| 5,073,272 | A | 12/1991 | O'Neill |
| 5,110,479 | A | 5/1992 | Frommer |
| 5,126,052 | A | 6/1992 | Lane |
| 5,178,764 | A | 1/1993 | Astegger |

(Continued)

OTHER PUBLICATIONS

Voges et al., Use of Iron Oxides to Enhance Metal Removal in Crossflow Microfiltration, 2001, Journal of Environmental Engineering, pp. 411-419.*

(Continued)

*Primary Examiner* — Vickie Kim
*Assistant Examiner* — Allison M Gionta

(57) ABSTRACT

Metal oxide particles heated while immersed in water in a closed container are combined with membrane filtration to remove contaminants from water. The use of the heated particles reduces fouling of the membrane typically encountered when membranes alone are used to remove contaminants from water.

19 Claims, 5 Drawing Sheets

U.S. PATENT DOCUMENTS

| | | | |
|---|---|---|---|
| 5,364,534 | A | 11/1994 | Anselme |
| 5,366,634 | A | 11/1994 | Vijayan |
| 5,369,072 | A | 11/1994 | Benjamin |
| 5,376,278 | A | 12/1994 | Salem |
| 6,113,792 | A | 9/2000 | Benjamin |

OTHER PUBLICATIONS

Anand, P., "Evaluation of Ion-Exchange Properties of Ferric-Hydroxide Flocs for the Removal of Heavy Metal Wastes Using a High Gradient Magnetic Separator," doctoral dissertation, Purdue University, Lafayette, Ind., May 1984.

Anand, P., et al., "Heavy Metals Removal by High Gradient Magnetic Separation," IEEE Transactions on Magnetics MAG-21(5):2062-2064, Sep. 1985.

Anderson, N.J., et al., "Colour and Turbidity Removal With Reusable Magnetic Particles—III: Immobilized Metal Hydroxide Gels," Water Research 16(8):1327-1334,1982.

Chen, A.S.C., et al., "Activated Alumina Adsorption of Dissolved Organic Compounds Before and After Ozonation," Environmental Science & Technology 21(1):83-90, Jan. 1987.

Chen, A.S.C., et al., "Activated Alumina for Removing Dissolved Organic Compounds," Journal of the American Water Works Association 81(1):53-60, Jan. 1989.

Davies, S.H.R., and J.J. Morgan, "Manganese(II) Oxidation Kinetics on Metal Oxide Surfaces," Journal of Colloid and Interface Science 129(1):63-77, Apr. 1989.

Hlavay, J., et al., "Removal of Arsenic From Natural Waters," in L. Pawlowski et al. (eds.), "Chemistry for Protection of the Environment," Elsevier, New York, 1983, pp. 373-380.

Jenne, E.A., "Controls on Mn, Fe, Co, Ni, Cu, and Zn Concentrations in Soils and Water: The Significant Role of Hydrous Mn and Fe Oxides," in R.A. Baker (ed.), "Trace Inorganics in Water," ACS Publications: Advances in Chemistry Series, American Chemical Society, Washington, D.C., Jun. 1968, vol. 73, pp. 337-387.

Kinniburgh, D.G., and M.L. Jackson, "Cation Adsorption by Hydrous Metal Oxides and Clay," in M.A. Anderson and A.J. Rubin (eds.), "Adsorption of Inorganics at Solid-Liquid Interfaces," Ann Arbor Science Publishers, Ann Arbor, Mich., pp. 91-160,1981.

Knocke, W.R., et al., "Soluble Manganese Removal on Oxide-Coated Filter Media," Journal of the American Water Works Association 80(12):65-70, Dec. 1988.

Lion, L.W., et al., "Trace-Metal Adsorption Characteristics of Estuarine Particulate Matter: Evaluation of Contributions of Fe/Mn Oxide and Organic Surface Coatings," Environmental Science & Technology 16(10):660-666, Oct. 1982.

Schultz, M.F., "Desorption of Cations From Ferrihydrite," master's thesis, University of Washington, Seattle, Wash., pp. 28-41 and 62-76.

Schultz, M.F., et al., "Adsorption and Desorption of Metals on Ferrihydrite: Reversibility of the Reaction and Sorption Properties of the Regenerated Solid," Environmental Science & Technology 21(9):863-869, Sep. 1987.

Tobiason, J.E., and C.R. O'Melia, "Physicochemical Aspects of Particle Removal in Depth Filtration," Journal of the American Water Works Association 80(12):54-64, Dec. 1988.

Valentine, R.L., et al., "Radium Removal Using Sorption to Filter Sand," Journal of the American Waterworks Association 79(4):170-176, Apr. 1987.

Anderson, P.R., and M.M. Benjamin, "Effects of Silicon on the Crystallization and Adsorption Properties of Ferric Oxides," Environmental Science and Technology 19(11):1048-1053, Nov. 1985.

Cai, Z., et al., "NOM Removal by Adsorption and Membrane Filtration Using Heated Aluminum Oxide Particles," Environmental Science & Technology 42(2):619-623, Jan. 2008.

Edwards, M., et al., "Regeneration and Reuse of Iron Hydroxide Adsorbents in Treatment of Electroplating Wastes," Proceedings of the 60th Industrial Waste Symposium, Philadelphia, 1987, pp. 142-155.

Kim, J., et al., "Effects of Adsorbents on Membrane Fouling by Natural Organic Matter," Journal of Membrane Science 310(1-2):356-364, Mar. 2008.

Kim, J., et al., "Simultaneous Removal of Phosphorus and Foulants in a Hybrid Coagulation/Membrane Filtration System," Water Research 42(8-9):2017-2024, Apr. 2008.

Murray, J.W., "Iron Oxides," in R.G. Burns (ed.), "Marine Minerals," Mineralogical Society of America, Reviews in Mineralogy, 1979, vol. 6, Chapter 2, pp. 47-98.

Shi, W., and M.M. Benjamin, "Membrane Interactions With NOM and an Adsorbent in a Vibratory Shear Enhanced Filtration Process (VSEP) System," Journal of Membrane Science 312(1-2):23-33, Apr. 2008.

Tipping, E., "The Adsorption of Aquatic Humic Substances by Iron Oxides," Geochimica et Cosmochimica Acta 45(2):191-199, Feb. 1981.

* cited by examiner

METHOD FOR REMOVING CONTAMINANTS FROM LIQUIDS USING MEMBRANE FILTRATION IN COMBINATION WITH PARTICLE ADSORPTION TO REDUCE FOULING

CROSS-REFERENCE TO RELATED APPLICATION

This application claims the benefit of Provisional Application No. 61/074,068, filed Jun. 19, 2008, expressly incorporated herein by reference in its entirety.

FIELD OF THE INVENTION

The present invention relates to methods for removal of contaminants from liquids utilizing membrane filtration and particulate adsorbents, reducing fouling of the membrane in such methods, and preparing particulate adsorbents for use in such methods.

BACKGROUND

In recent years, membrane technology has been extensively investigated for water treatment. In addition to removing particulates, some membrane processes that use membranes with very small pores are able to remove a significant amount of natural organic matter (NOM); however, the NOM that is removed often contributes to fouling of the membranes, even when only a small fraction of the NOM in the feed solution is removed.

In conventional membrane systems, molecules that are larger than the pore size of the membrane and those that adsorb to the membrane surface are retained, while other molecules pass through the membrane along with the permeate flow. It has been proposed that powdered activated carbon (PAC) be used in conjunction with membranes to adsorb a portion of the NOM. Then, the membrane rejects the PAC particles and the adsorbed NOM. In this way, fewer NOM molecules remain in solution and contact the membrane directly. While the NOM removal efficiency of such a combined process can be quite high, membrane fouling is often not reduced proportionately, and in some cases it is even exacerbated.

In addition to powdered activated carbon, it has been proposed that freshly precipitated iron oxides (FeOOH or $Fe_2O_3 \cdot nH_2O$) or aluminum oxides ($Al_2O_3$) be used in conjunction with membranes to reduce fouling of the membrane. Like PAC, these freshly precipitated oxides sometimes reduce fouling and sometimes exacerbate it. Also, if the oxides accumulate on the membrane until they form a continuous layer, that layer can impart a very large hydraulic resistance, making it almost impossible for water to pass through the layer and reach the membrane.

U.S. Pat. No. 6,113,792 describes heating precipitated iron oxide particles in an oven to produce heated iron oxide particles useful with membrane filtration to remove contaminants from water.

With the ever increasing concern about the quality of drinking water, there continues to be a need for improved systems for effectively and economically removing contaminants such as natural organic matter from liquids. Such systems should provide effective removal of contaminants from the liquids and reliably reduce membrane fouling.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the subject matter described herein relate to methods for removing contaminants from liquids using membrane filtration in combination with contaminant adsorption onto suspended particles or particles that are pre-deposited (pre-coated) on the membrane and reducing fouling. In accordance with embodiments described herein, heated metal oxide, e.g., iron oxide or aluminum oxide, particles are used in combination with a membrane to remove contaminants from liquids, e.g., such as NOM from water. While a preferred embodiment is described below in the context of the removal of NOM molecules from water, it should be understood that the process may be used to remove other adsorbable contaminants, e.g., metals, and is not limited to water as the liquid.

In another aspect, embodiments of the subject matter described herein relate to methods of preparing a particulate adsorbent for use in combination with a membrane to remove contaminants from water and reduce fouling of the membrane.

In an embodiment relating to a method for reducing fouling in a process of removing contaminants from water utilizing a particulate adsorbent and a membrane, contaminant containing water is first contacted with the particulate adsorbent that comprises metal oxide particles heated while remaining immersed in water. At least a portion of the contaminants in the water are adsorbed onto the adsorbent particles that are unable to pass through the membrane. Thus, during or after the adsorbing step, as the permeate passes through the membrane, the adsorbent particles are retained by the membrane as part of the concentrate. When membrane filtration is carried out in accordance with embodiments described herein, no substantial decrease in permeate flux over an extended period occurs.

In a particular embodiment of the methods described herein, adsorbent particles are dosed into a membrane system along with a small amount of clean water or influent flow during the first few seconds or minutes of a treatment cycle. This results in the particles being deposited on the membrane surface or, if the system is operated with recirculating flow, they become part of the recirculating flow that continually passes along and through the "concentrate" side of the membrane (see FIG. 1). The dose of adsorbent particles added during this time is sufficient to form a nearly continuous layer at least 20 μm thick on the membrane surface. Once the initial dose of particles is added, the feed flow is initiated or continues. Additional particles may or may not be added subsequently, either continuously or intermittently. During the subsequent treatment cycle, the entering flow contacts the adsorbent particles that are deposited on the membrane or are mixed with the flow in the circulating fluid. As a result, at least a portion of the contaminants in the water are adsorbed onto the adsorbent particles that are unable to pass through the membrane. A typical treatment cycle lasts one hour or more, at which time the particles are flushed from the system and a new cycle begins.

In a preferred embodiment, the metal oxide particles are prepared by preparing an aqueous solution of ferric ion or aluminum ion and hydroxyl ion. The ferric ion or aluminum ion is then converted to its corresponding oxide to produce a suspension of the oxide. This suspension is then heated while the oxide particles are fully immersed in water in a closed container to provide heated particles of iron oxide or aluminum oxide useful in embodiments described herein.

DESCRIPTION OF THE DRAWINGS

The foregoing aspects and many of the attendant advantages of the subject matter described herein will become more readily appreciated as the same become better understood by reference to the following detailed description, when taken in conjunction with the accompanying drawings, wherein.

DETAILED DESCRIPTION

Figure 1:
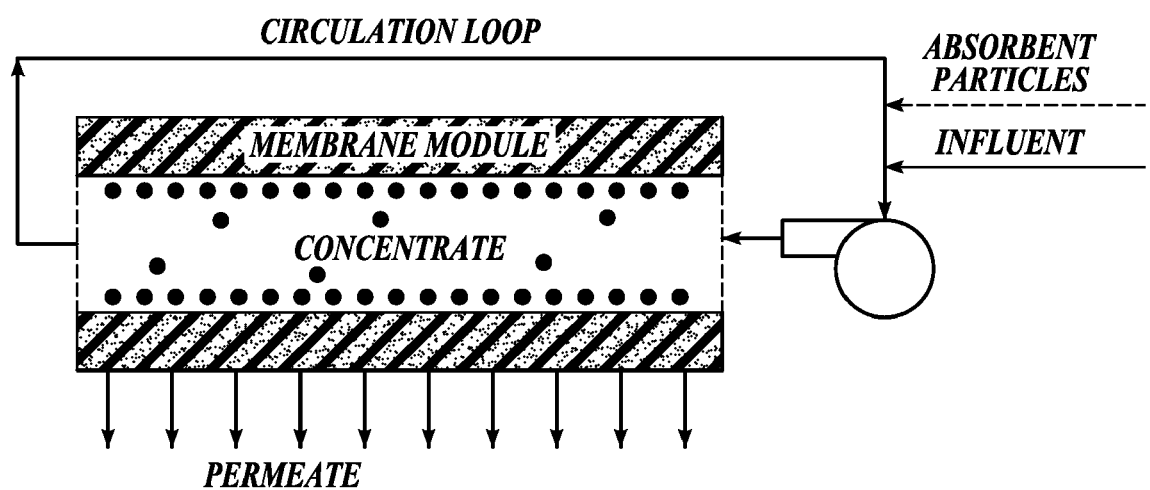
FIG. 1 is a schematic illustration of a membrane circulation loop employing a method carried out in accordance with embodiments described herein.

The present description proceeds with reference to a specific embodiment of a liquid, namely water and seawater. It should be understood that the benefits of the present invention may also apply to other types of liquids that can be filtered using membranes.

In pressure-driven membrane systems, water moves toward and through the membrane surface due to the pressure gradient in that direction. Contaminants, such as natural organic matter (NOM), are brought to the membrane surface by this flow. Depending on the size of the NOM molecules and their affinity for the surface of the membrane, the NOM is either retained on the "concentrate" side of the membrane or inside the membrane pores, or it passes through the membrane as permeate. It is currently beyond scientific capabilities to identify precisely the composition of the molecules that comprise NOM. Many of these molecules are degradation products from the decay of living matter. NOM is found in both fresh water and salt water. In the absence of a more precise classification, the wide range of NOM is classified into a few composite categories. Humic and fulvic substances are the largest such categories. It has been estimated that, on the average, 50% of the dissolved organic matter in rivers falls into these two categories, although the percentage in any particular river could be anywhere from 10% to 90%. Other constituents of NOM include proteins, polysaccharides, and other byproducts from microbial activity in the watershed or the water itself.

Membranes useful in the methods described herein include those known in the art and used in microfiltration, ultrafiltration, and nanofiltration systems. Each of the above filtration systems employs a membrane, the difference being the size of the pores in the membrane. For microfiltration, the membranes typically have pores having an average diameter on the order of 0.1 to several microns. Ultrafiltration typically refers to membranes having pores ranging in size from about 0.001-0.1 microns. Membranes having pores generally on the order of 0.0005-0.002 microns are referred to as nanofiltration membranes. Each of these membranes separates the influent into a concentrate and a permeate. As discussed above, those constituents in the influent that are small enough to pass through the pores of the membrane and do not bind to the surface of the membrane or to previously retained contaminants pass through the membrane as permeate. Those constituents in the influent that do not pass through the pores are retained.

Examples of suitable membranes for use in accordance with the present invention include membranes made of cellulose acetate derivatives, polyethersulfone, or polyvinyldifluoride. Preferred membranes are hollow fiber membranes capable of receiving influent flow into the inside of the fiber with the permeate passing through the membrane wall. An example of a membrane fiber useful in embodiments of the methods described herein has an inside diameter on the order of 1.0-2.0 millimeter and a wall thickness of about 0.4 millimeters. Most of the membrane wall is merely supporting material, in that the thickness of the membrane layer itself is less than 1.0 micrometer. Such types of membranes can typically be operated with a permeate flux on the order of about 50-150 $L/m^2$-hr. It should be understood that the methods described herein are not limited to the use of any particular type of membrane. The composition of the membrane and the size of the pores of the membrane may vary over a wide range, depending on the particular contaminants that are to be removed. Flat sheet membranes may also be used in combination with the particulate adsorbents and the filtration methods described herein.

Particulate adsorbents useful to reduce fouling of membrane filters include those particulate adsorbents capable of adsorbing the contaminant of interest and also reducing or preventing fouling of the membrane. Without intending to be limited to any particular theory, when water (fresh or salt) is driven through a membrane, the contaminants, such as NOM, that are rejected by the membrane tend to remain near the membrane surface, so that the contaminant concentration is higher near the membrane surface than in the bulk solution. This phenomenon is often referred to as concentration polarization, and the region where the concentration polarization occurs is called the concentration polarization layer. If the concentration of the contaminant in the concentration polarization layer exceeds the solubility of the contaminant in the water, then the contaminant may precipitate or otherwise deposit as a gel layer or other flow restricting layer on the membrane surface. At this time, it is believed that the formation of this flow restricting layer contributes to the fouling of the membrane.

In accordance with the methods described herein, use of metal oxide particles, e.g., iron oxide or aluminum oxide particles heated as described herein, reduces fouling typically encountered when membrane filtration is used to remove contaminants, such as NOM, from water. While the following discussion will focus on preferred heated aluminum oxide particles, it should be understood that the description is applicable to other types of particles, such as iron oxide particles. In addition, the following discussion focuses on the removal of NOM from water; however, it should be understood that other contaminants, such as metals, may also be removed from water employing the adsorbent/membrane filtration processes described herein by using a particulate adsorbent having an affinity for the metal.

The heated iron oxide and heated aluminum oxide particles of the embodiments described herein are to be distinguished from freshly precipitated iron oxide particles and freshly precipitated aluminum oxide particles that have not been heated after precipitation. Although these unheated freshly precipitated oxide particles are known to be effective adsorbents for NOM, they often do not reduce or prevent fouling of the membrane (in fact, they can contribute to the fouling of the membrane), and thick layers of such particles deposited on the membrane are often not useful, because such layers are too impermeable to be useful in a membrane process.

The heated iron oxide and aluminum oxide particles of the embodiments described herein differ from the freshly precipitated iron oxide or aluminum oxide particles in that they are subjected to a controlled heating step after the oxides are precipitated. This heating of the iron oxide or aluminum oxide particles is controlled to avoid overheating the particles to the point where their adsorption capacity for NOM is reduced.

One method of preparing metal oxide particles involves the step of first providing iron ions or aluminum ions in an aqueous solution. Iron-ion-containing solutions can be provided by adding ferric chloride or ferric nitrate, or other ferric salts, to water. Solutions of aluminum ions can be provided by adding aluminum sulfate or aluminum chloride to water. However, it has been found that aluminum sulfate is preferred over aluminum chloride for this application, because aluminum chloride forms soluble polymers rather than particles when neutralized and heated. Hydroxyl ion is then added to the solution to reach a final pH in the range from 5.0 to 9.0. Iron oxide or aluminum oxide particles are allowed to precipitate and form a suspension of the oxide particles. This suspension of oxide particles is then heated with the particles remaining fully immersed in water. Maintaining the particles immersed in water during the heating step can be achieved by heating the suspension while in a closed container in order to minimize evaporation. Examples of a closed container include a sealed flask or other container sealed so as to prevent evaporation of water. The temperature at which the particles are heated and the length of time the particles are heated should be chosen so that the desired antifouling characteristics for the heated particles is achieved. For example, the heating can be carried out at a temperature ranging from about 80° C. to about 130° C. The particles have the desired properties when heated at 100° C. for a time period on the order of 24 hours. However, longer or shorter heating periods and higher or lower temperatures may generate particles with similar or more attractive properties. Since the particles are heated while fully immersed in water, at the end of the heating the particles remain immersed in water. If necessary, the heated suspension can be resuspended in water, settled, and decanted several times to remove dissolved salt ions.

As used herein, the term "immersed" refers to a condition wherein the solid particles remain suspended in the water. When solid particles are suspended in water, there is free water that remains and can be drained off of or removed from the suspension. In contrast, when the solid particles are not completely immersed or are not suspended, no free water exists to be drained from the particles.

The above description of the preparation of heated iron oxide and heated aluminum oxide particles is illustrative of a method for making particles that are effective at adsorbing NOM and reducing or preventing fouling of the membrane in accordance with embodiments described herein. It should be understood that different heating schemes may be used to achieve the desired results. For example, higher temperatures for shorter periods of time or lower temperatures for longer periods of time may be employed.

The process of using the heated particulate adsorbents and a membrane to remove contaminants can be practiced in a number of forms. In all cases, the heated iron oxide particles or heated aluminum oxide particles are contacted with the water before or at the same time as it is passed through the membrane. Such contact can occur using a static system wherein the influent flow is introduced into the membrane at a rate that is substantially equivalent to the permeate flux through the membrane. A static system is also referred to as a "dead-end" type of approach to pumping the influent into the membrane.

Another approach employs a recirculating membrane filtration system wherein the contaminated water is continuously circulated parallel to the membrane as the permeate passes through the membrane wall. A system with such circulation is referred to as a system with "crossflow." Initially, the heated adsorbent particles are introduced into a stream of clean water or influent water in either dead-end or crossflow mode. Permeation of the water is preferably continued until a cake forms on the surface of the membrane. Influent is then introduced into the stream and continued until excessive fouling (as indicated by a reduction in permeate flow or an increase in the pressure required to maintain an acceptable permeation rate) is observed or an unacceptably high NOM concentration is observed in the permeate. At this point, the membrane can be backwashed or cleaned in other ways to remove contaminants or particles that have accumulated on the membrane surface or within the pores of the membrane. Other approaches for cleaning the membrane include inducing a tangential flushing step (with or without air entrained in the flow) to clean off the surface of the membrane, adding acid or base to dissolve the particles, adding an oxidant or reductant or detergent to dissolve the accumulated contaminants, or other processes.

In accordance with embodiments described herein, additional absorbent particles can be introduced during the filtration process. For example, after predetermined amounts of influent have been filtered, fresh heated absorbent particles can be introduced into the influent. Further details regarding this aspect of the subject matter described herein are provided in Example 3 below.

Further discussion regarding the embodiments described herein is provided in the following three publications, the contents of which are fully incorporated herein by reference in their entirety.

1. Jaeshin Kim, Qianru Deng, and Mark M. Benjamin, "Simultaneous Removal of Phosphorus and Foulants in a Hybrid Coagulation/Membrane Filtration System," *Water Research* 42:2017-2024, 2008;
2. Zhenxiao Cai, Jaeshin Kim, and Mark M. Benjamin, "NOM Removal by Adsorption and Membrane Filtration Using Heated Aluminum Oxide Particles," *Environmental Science & Technology* 42:619-623, 2008;
3. Jaeshin Kim, Zhenxiao Cai, and Mark M. Benjamin, "Effects of Adsorbents on Membrane Fouling by Natural Organic Matter," *Journal of Membrane Science* 310:356-364, 2008.

It has been observed that the combination of membrane filtration and iron oxide or aluminum oxide particles heated in accordance with embodiments described herein provides dissolved organic carbon (DOC) removal efficiencies that are equal to or greater than those when conventional (e.g., unheated iron oxide or aluminum oxides or iron oxide) or other (e.g., aluminum oxide particles that have been heated while not being immersed in water) particles are added and substantially greater than those for membrane filtration alone. Also, as explained below in more detail, a membrane filtration system that employs iron oxide or aluminum oxide particles heated in accordance with embodiments described herein is able to maintain a permeate flux over an extended period of time that is substantially greater than in the absence of particles. In contrast, when unheated freshly precipitated iron oxide particles are combined with membrane filtration, fouling of the membrane occurs more quickly.

Example 1

Heated aluminum oxide particles (HAOP) were prepared by neutralizing 1.5 M aluminum sulfate to pH 7.0±0.1 with 3 N sodium hydroxide and heating the resulting slurry of hydrous aluminum oxide particles at 110° C. in a closed container for 24 hours. During heating, the particles remained immersed in water. The heated slurry was then rinsed with deionized water to remove residual salt. The heated aluminum oxide particles were 26% aluminum by weight, and had a mean effective diameter of 10.4 micrometers, with 90% of the particles in the size range from 2-30 micrometers. The particles $pH_{pzc}$ was 7.8 based on analysis of their electrophoretic mobility. The particles BET surface area was 116 $m^2$/gram.

Heated iron oxide particles (HIOP) were produced by neutralizing 3 M iron chloride to pH 7.0 with sodium hydroxide. The neutralized suspension was heated at 110° C. for 24 hours in a closed container and the particles remained immersed in water during the heating. After heating was completed, dissolved salts were removed by repeated rinsing the solids with deionized water. The heated iron oxide particles had a mass fraction of metal of 42% iron, based on analysis of freeze dried particles. The mean diameter for the particles on a volume basis was 13.3 micrometers.

Example 2

In this example, the NOM removal ability of aluminum oxide particles and iron oxide particles prepared according to Example 1 is compared to the NOM removal ability of aluminum and iron oxide particles prepared and heated in accordance with the method described in Example 1 of U.S. Pat. No. 6,113,792.

The heated aluminum oxide particles and heated iron oxide particles prepared in accordance with the process described in Example 1 of U.S. Pat. No. 6,113,792 were prepared by a process similar to the process described in Example 1 above; however, the suspension, when heated at 110° C. for 24 hours was heated in an open container, not a closed container. When the particles were heated in an open container, they did not remain immersed in the water or in suspension during the entire period of heating. In contrast, when the particles were heated in a closed container, they remained immersed in water and remained in suspension during the entire heating period.

Water was collected from Lake Washington and was prefiltered to remove particles larger than 0.45 μm. This prefiltration process removed negligible NOM from the water. The water was then mixed with different concentrations of the particles for one hour, after which the particles were removed by filtration through filters with 0.45-μm pores, and the solution that passed through these filters was analyzed.

The amount of NOM in the water samples is indicated by the UV absorbance of solution. UV absorbance was measured at 254 nanometers using a dual beam spectrophotometer model Lambda-18 from Perkin Elmer GMBH. The results are summarized in FIG. 3. The metal oxide particles of Example 1 above are designated as "wet" in FIG. 3. The particles prepared by the method described in Example 1 of U.S. Pat. No. 6,113,792, are noted as "dry" in FIG. 3.

Figure 3:
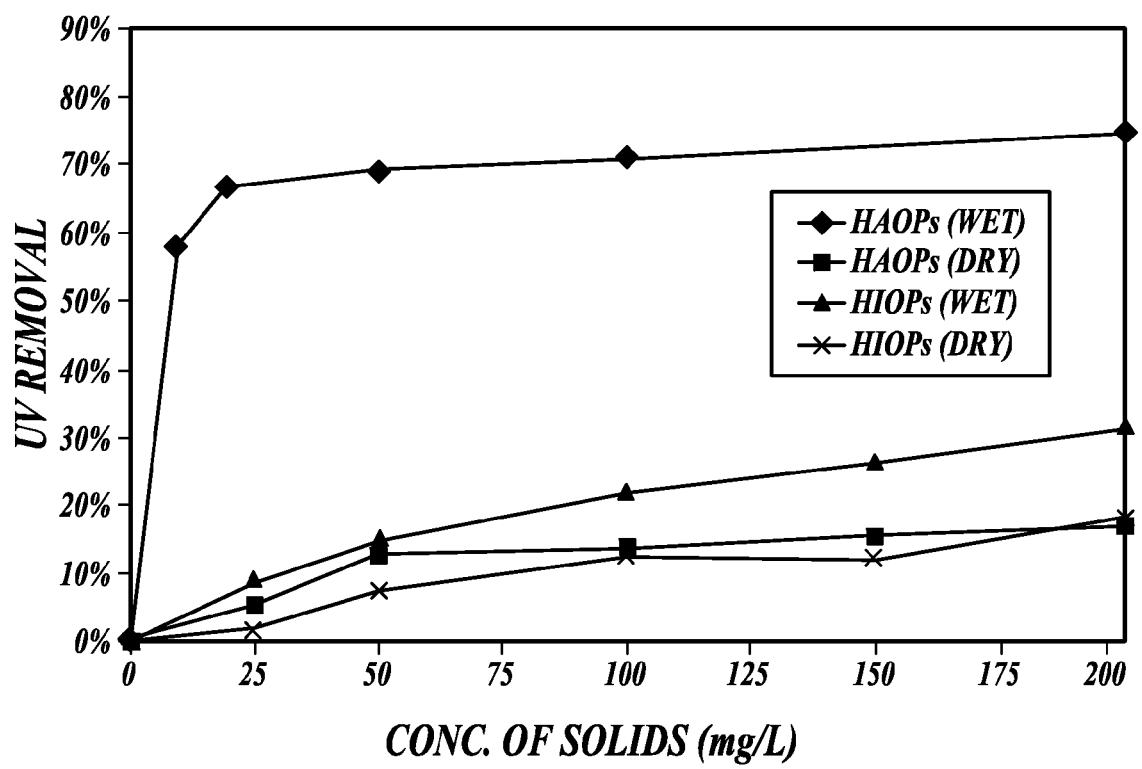
FIG. 3 is a graphical illustration of NOM removal using metal oxide particles heated in accordance with embodiments of the present disclosure and heated metal oxide particles of U.S. Pat. No. 6,113,792.

FIG. 3 illustrates the effectiveness of heated particles prepared in accordance with Example 1 above at removing NOM. The results illustrate that iron oxide and aluminum oxide particles prepared in accordance with Example 1 are more effective at removing NOM compared to iron oxide and aluminum oxide particles prepared according to Example 1 of the '792 patent.

Example 3

In this example, the ability of aluminum oxide particles prepared according to Example 1 to remove NOM from sea water was evaluated.

The sea water was collected from Puget Sound near Seattle, Wash. The sea water was allowed to warm to room temperature before filtering.

The membrane employed was a 47 mm diameter disc made of polycarbonate with a pore diameter of 12 μm. Each membrane was wetted for at least 2 hours and then rinsed by permeation of 100 milliliters of deionized water before being used.

Adsorbent solids were deposited on the membrane at loadings of 9 $g/m^2$ or 18 $g/m^2$ prior to initiating the feed of sea water. All experiments utilized dead end filtration, with feed delivery by a peristaltic pump at a constant flux of 100 $L/m^2$-hour.

In one experiment, after the initial loading onto the membrane of 9 $g/m^2$ of heated aluminum oxide particles, another 9 $g/m^2$ was added after each increment in specific filtered volume ($V_{sp}$) equal to 3600 $L/m^2$. The dosing of heated aluminum oxide particles is based on grams of aluminum per square meter.

Figure 4:
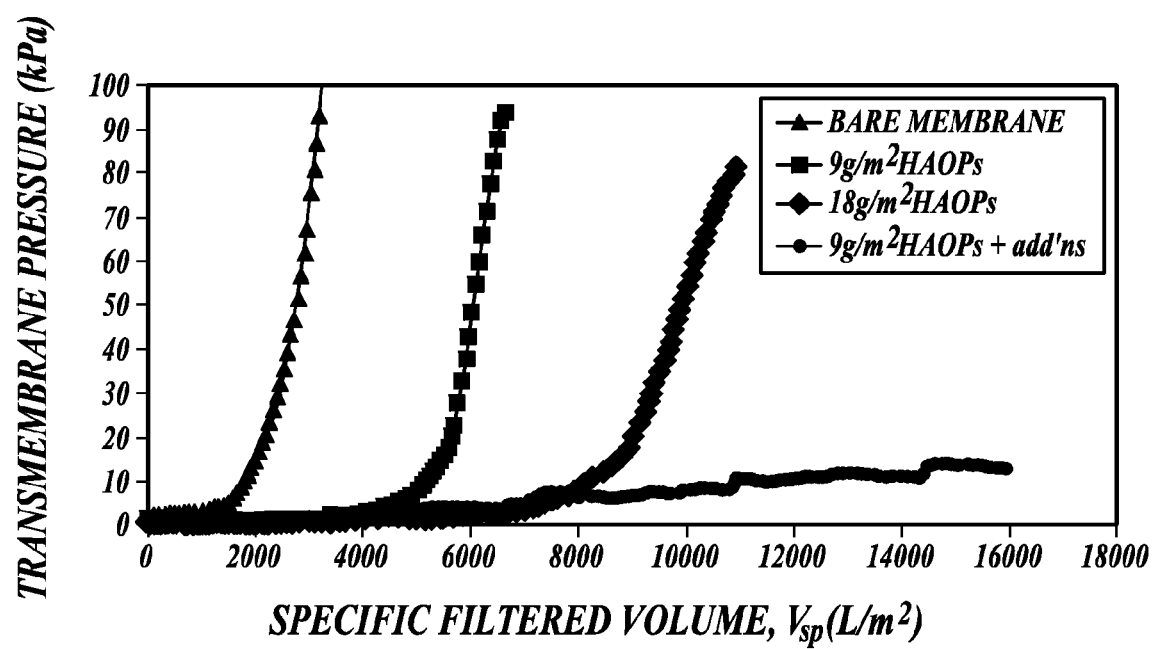
FIG. 4 is a graphical illustration of transmembrane pressure as a function of the volume of sea water filtered through a membrane in the presence of heated aluminum oxide particles.

The results are illustrated in FIG. 4.

The results illustrate how heated aluminum oxide particles of Example 1 delay the onset of fouling. A particularly dramatic reduction in fouling was observed in the experiment wherein heated aluminum oxide particles were introduced intermittently after each cycle of 3600 $L/m^2$ of sea water influent.

Example 4

In an effort to assess the effect on fouling of the heated aluminum oxide particles and heated iron oxide particles of Example 1 above, the effect on the transmembrane pressure as a function of a specific volume of fresh water filtered was evaluated. A similar evaluation was carried out for powdered activated carbon (PAC) from Sigma Aldrich having a mean diameter of 33.9 micrometers and silica having an average diameter of 15 micrometers available under the trade name Minusil® from U.S. Silica Co., Berkeley Springs, West Va.

The water employed was collected from a local fresh water lake. The raw water was filtered through a membrane with 0.45 micrometer nominal pore size within 24 hours of collection. The filtered water was stored in pre-washed glass bottles in the dark at 4° C. and was brought to room temperature immediately prior to use.

The membrane employed was a 47 millimeter diameter disk made of mixed cellulose esters (Millipore® Model BSWP 04700), with a nominal pore size of 0.025 micrometers and an effective area of 9.62 $cm^2$. Each membrane was wetted for at least 2 hours and then rinsed by permeation of 100 milliliters of deionized water before being used.

Figure 2:
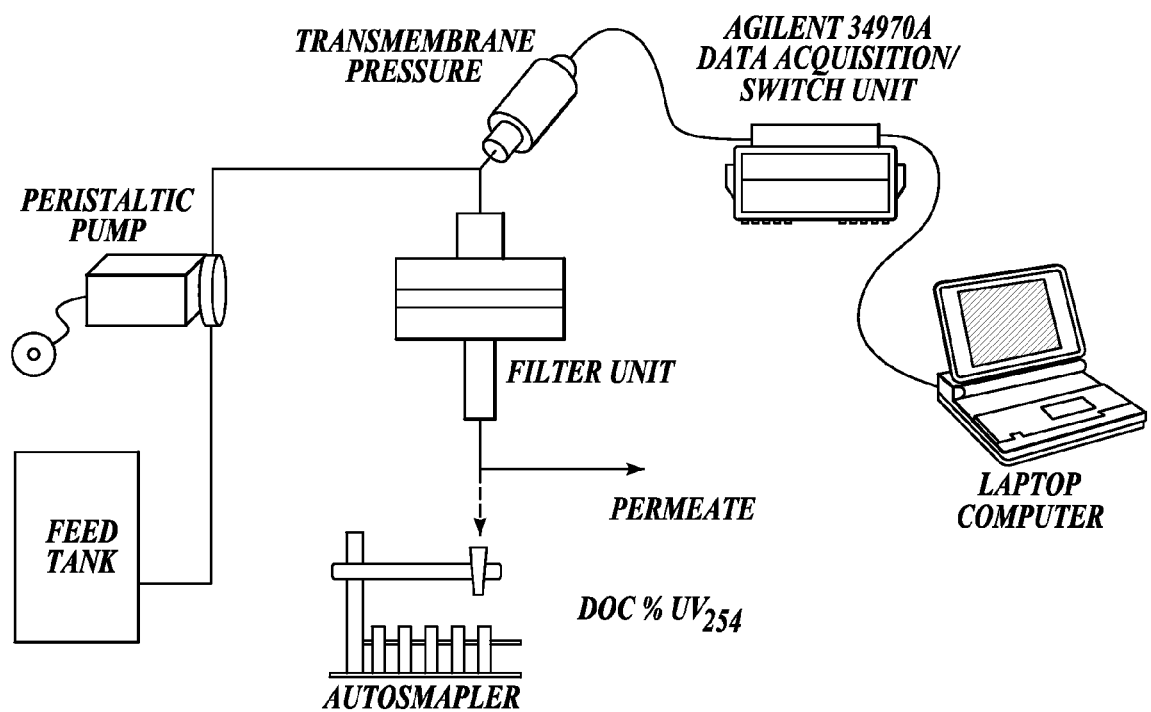
FIG. 2 is a schematic illustration of the experimental set-up used to collect transmembrane pressure values and contaminant removal data using UV measurements.

The adsorbent solids were deposited on the membrane prior to initiating the feed of water. The deposited mass of each adsorbent was 58 milligrams, or 60.3 grams/$m^2$. All experiments utilized dead-end filtration, with feed delivery by a peristaltic pump at a constant flux of 100 l/$m^2$-hr. Transmembrane pressure (TMP) was measured online using a transducer (Model PX302-100 GB, Omega Engineering, Inc.

of Stamford, Conn.) and was recorded on a laptop computer via a data acquisition system (34970A, from Agilent Technologies of Santa Clara, Calif.). This system is schematically illustrated in FIG. 2.

Figure 5:
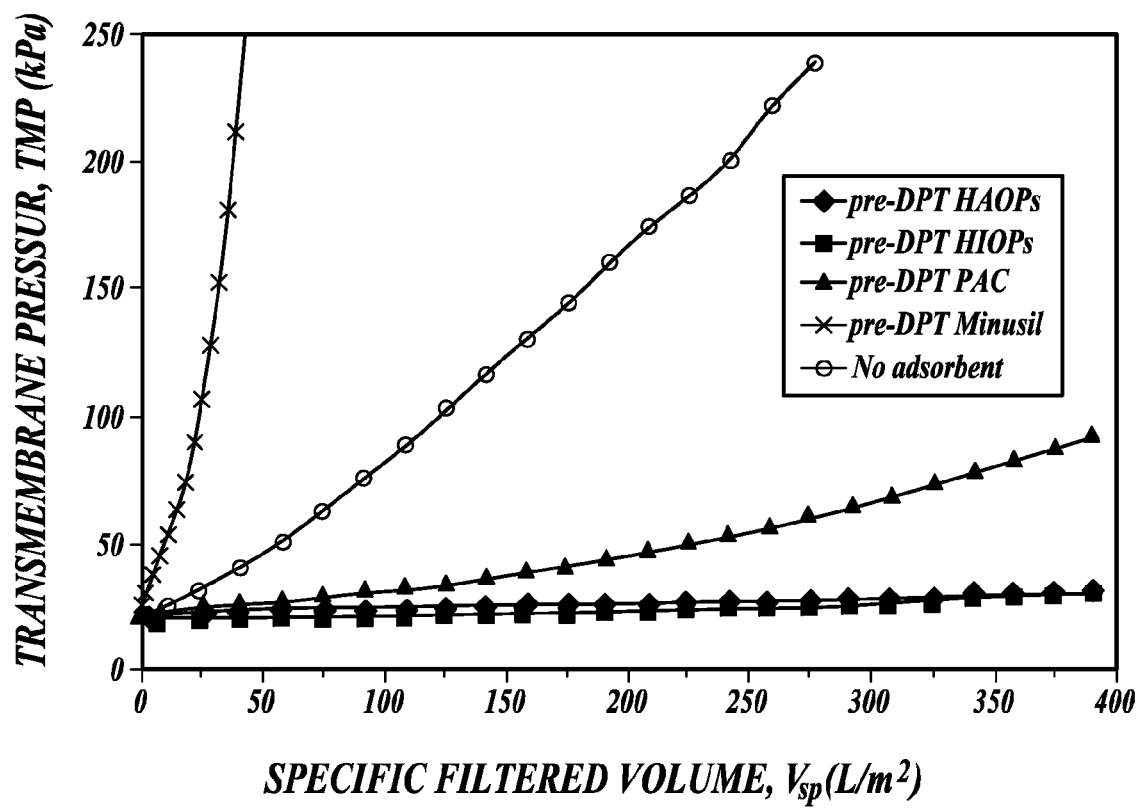
FIG. 5 is a graphical illustration of transmembrane pressure values as a function of the volume of freshwater filtered through a membrane in the presence of different types of particles.

The results are illustrated in FIG. 5. The results show that the fouling rate in systems with predeposited heated aluminum oxide particles and heated iron oxide particles was much lower than in systems with pre-deposited PAC, Minusil, or no adsorbent at all.

While preferred embodiments have been illustrated and described, it will be appreciated that various changes can be made therein without departing from the spirit and scope of the subject matter described herein. For example, the novel and inventive aspects of the subject matter described herein extend to the removal of contaminants other than NOM.

The embodiments of the invention in which an exclusive property or privilege is claimed are defined as follows:

1. A method for removing contaminants from a liquid by passing the liquid through a membrane, comprising the steps:
    contacting the liquid with metal oxide particles that have been heated while maintaining the particles completely immersed in water during the heating step so that the particles remain suspended in the water throughout the heating step;
    adsorbing a portion of the contaminants from the liquid onto the particles; and
    passing a portion of the liquid through the membrane to separate the liquid into a permeate and a concentrate.

2. The method of claim 1, wherein the contaminants are natural organic matter.

3. The method of claim 2, wherein the liquid is fresh water.

4. The method of claim 2, wherein the liquid is saltwater.

5. The method of claim 1, wherein the metal oxide particles are aluminum oxide particles or iron oxide particles.

6. A method of preparing metal oxide particles for use in combination with a membrane to remove contaminants from liquid and to reduce fouling of the membrane, comprising:
    heating the metal oxide particles while maintaining the metal oxide particles completely immersed in water so that the metal oxide particles remain suspended in the water throughout the heating step.

7. The method of claim 6, wherein the heating step is carried out at a temperature ranging from about 80° C. to about 130° C.

8. The method of claim 6, wherein the heating step is carried out in a closed container.

9. The method of claim 6, wherein the metal oxide particles are particles of aluminum oxide or iron oxide.

10. The method of claim 6, wherein the heating step is carried out for 1 to 24 hours.

11. A method for preparing metal oxide particles for use in combination with a membrane to remove contaminants from a liquid and reduce fouling of the membrane, comprising the steps:
    preparing an aqueous solution of metal ion and hydroxyl ion;
    converting the metal ion to oxide particles;
    heating the metal oxide particles while maintaining the particles completely immersed in water so that the metal oxide particles remain suspended in the water throughout the heating step; and
    recovering the heated metal oxide particles.

12. The method of claim 11, wherein the contaminants are natural organic matter.

13. The method of claim 12, wherein the liquid is fresh water.

14. The method of claim 12, wherein the liquid is saltwater.

15. The method of claim 11, wherein the metal oxide particles are aluminum oxide particles or iron oxide particles.

16. The method of claim 1, further comprising:
    introducing metal oxide particles that have been heated while immersed in water into the concentrate.

17. The method of claim 1, wherein the heating step is carried out in a closed container.

18. The method of claim 1, wherein the particles are more effective at removing natural organic material relative to particles that have not been completely immersed in water during a heating step.

19. The method of claim 11, wherein the heating step is carried out in a closed container.

* * * * *